(12) United States Patent
Jung

(10) Patent No.: US 8,034,887 B2
(45) Date of Patent: Oct. 11, 2011

(54) PROCESS FOR PREPARING MICROCAPSULES

(75) Inventor: Marc Rudolf Jung, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/744,596

(22) PCT Filed: Dec. 16, 2008

(86) PCT No.: PCT/EP2008/067613
§ 371 (c)(1),
(2), (4) Date: May 25, 2010

(87) PCT Pub. No.: WO2009/077525
PCT Pub. Date: Jun. 25, 2009

(65) Prior Publication Data
US 2010/0261839 A1    Oct. 14, 2010

(30) Foreign Application Priority Data
Dec. 19, 2007    (EP) ................. 07123650

(51) Int. Cl.
*B01J 13/14* (2006.01)
(52) U.S. Cl. ................. 526/201; 524/457; 525/201
(58) Field of Classification Search ............ 526/201; 524/457; 525/201
See application file for complete search history.

(56) References Cited

U.S. PATENT DOCUMENTS

| | | | |
|---|---|---|---|
| 5,398,690 A | 3/1995 | Batten et al. | |
| 5,456,852 A | 10/1995 | Isiguro | |
| 2007/0248824 A1* | 10/2007 | Lang-Wittkowski et al. | 428/402.24 |
| 2008/0318048 A1 | 12/2008 | Amrhein et al. | |
| 2009/0289216 A1 | 11/2009 | Jung et al. | |
| 2010/0068525 A1 | 3/2010 | Jung et al. | |

FOREIGN PATENT DOCUMENTS

| | | |
|---|---|---|
| DE | 2 214 410 | 10/1973 |
| DE | 24 45 813 | 4/1976 |
| DE | 44 19 518 | 12/1995 |
| DE | 44 35 422 | 4/1996 |
| DE | 44 35 423 | 4/1996 |
| DE | 196 29 525 | 1/1998 |
| DE | 196 29 526 | 1/1998 |
| DE | 101 39 171 | 2/2003 |
| DE | 10 2007 055 813 | 6/2008 |
| EP | 0 407 889 | 1/1991 |
| EP | 0 784 449 | 7/1997 |
| EP | 1029018 | 8/2000 |
| WO | 2005 116559 | 12/2005 |
| WO | 2006 018130 | 2/2006 |
| WO | WO 2006018130 A1 * | 2/2006 |
| WO | 2006 053714 | 5/2006 |
| WO | 2006 092439 | 9/2006 |
| WO | 2008 006762 | 1/2008 |
| WO | 2008 071649 | 6/2008 |
| WO | 2008 116763 | 10/2008 |

OTHER PUBLICATIONS

Anonym: "Culminal-Methylcellulose, Methylhydroxyethylcellulose, Methylhydroxypropylcellulose: Physical and Chemical Properties.", Hercules-Aqualon Brochure, Total pp. 32 XP002524919 Retrieved from the Internet: URL:http://www.herc.com/aqualon/product-data/brochures/22001e3.pdf>.
U.S. Appl. No. 12/812,325, filed Jul. 9, 2010, Hantze, et al.
U.S. Appl. No. 12/918,728, filed Aug. 20, 2010, Jung, et al.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The present invention relates to a process for preparing microcapsules comprising a lipophilic capsule core and a capsule wall synthesized from 30% to 100% by weight, based on the total weight of the monomers, of one or more monomers (monomers I) from the group comprising $C_1$-$C_{24}$ alkyl esters of acrylic and/or methacrylic acid, acrylic acid, methacrylic acid, and maleic acid, 0% to 70% by weight, based on the total weight of the monomers, of one or more difunctional or polyfunctional monomers (monomers II) which are sparingly soluble or insoluble in water, and 0% to 40% by weight, based on the total weight of the monomers, of one or more other monomers (monomers III).

20 Claims, No Drawings

PROCESS FOR PREPARING MICROCAPSULES

The present invention relates to a process for preparing microcapsules comprising a lipophilic capsule core and a capsule wall synthesized from 30% to 100% by weight, based on the total weight of the monomers, of one or more monomers (monomers I) from the group comprising $C_1$-$C_{24}$ alkyl esters of acrylic and/or methacrylic acid, acrylic acid, methacrylic acid, and maleic acid, 0% to 70% by weight, based on the total weight of the monomers, of one or more difunctional or polyfunctional monomers (monomers II) which are sparingly soluble or insoluble in water, and 0% to 40% by weight, based on the total weight of the monomers, of one or more other monomers (monomers III).

Microcapsules with wall material based on a highly crosslinked methacrylic ester polymer and also processes for preparing them are known from EP-A-1 029 018, DE-A-101 39 171, WO 2005/116559, and the earlier European application 06117092.4. They all relate to microencapsulated latent heat storage materials in a very wide variety of construction applications. The processes for their preparation use $SiO_2$-based protective colloids in combination with methylcellulose having an average molecular weight of approximately 120 000 g/mol or with a polymer based on acrylamido-2-methylpropanesulfonic acid. It has emerged, however, that, when these protective colloids are used, there are, unpredictably, again and again, reaction batches which during the polymerization, more particularly when the temperature is raised, undergo thickening and become unusable.

It was an object of the present invention, therefore, to find a process from which the above disadvantages are absent.

Found accordingly has been a process for preparing microcapsules comprising a lipophilic capsule core and a capsule wall synthesized from 30% to 100% by weight, based on the total weight of the monomers, of one or more monomers (monomers I) from the group comprising $C_1$-$C_{24}$ alkyl esters of acrylic and/or methacrylic acid, acrylic acid, methacrylic acid, and maleic acid, 0% to 70% by weight, based on the total weight of the monomers, of one or more difunctional or polyfunctional monomers (monomers II) which are sparingly soluble or insoluble in water, and 0% to 40% by weight, based on the total weight of the monomers, of one or more other monomers (monomers III), by preparing an oil-in-water emulsion comprising monomers and lipophilic substance, an $SiO_2$-based protective colloid, and a methylhydroxy-($C_1$-$C_4$)-alkylcellulose having an average molecular weight $\leq 50\,000$ g/mol and subsequently carrying out a free-radical polymerization.

The microcapsules obtained by the process of the invention comprise a capsule core of lipophilic substance and a capsule wall of polymer. The capsule core is composed predominantly—to an extent of more than 95% by weight—of lipophilic substance. Depending on the temperature the capsule core may be either solid or liquid.

The protective colloid is generally incorporated into the capsule wall and is therefore likewise a constituent of the capsule wall. Generally speaking, the surface of the polymer has the protective colloid, more particularly. Thus it is possible for there to be up to 10% by weight, based on the total weight of the microcapsules, of protective colloid.

The average particle size of the capsules (z-average by means of light scattering) is 0.5 to 50 µm, preferably 0.5 to 30 µm. The weight ratio of capsule core to capsule wall is generally from 50:50 to 95:5. Preference is given to a core/wall ratio of 70:30 to 93:7.

The polymers of the capsule wall comprise generally at least 30%, in a preferred form at least 40%, in a particularly preferred form at least 50%, more particularly at least 60%, with very particular preference at least 70%, and also up to 100%, preferably not more than 90%, more particularly not more than 85%, and, with very particular preference, not more than 80%, by weight, of at least one monomer from the group comprising $C_1$-$C_{24}$ alkyl esters of acrylic and/or methacrylic acid, acrylic acid, methacrylic acid, and maleic acid (monomers I), in copolymerized form, based on the total weight of the monomers.

Furthermore the polymers of the capsule wall comprise preferably at least 10%, preferably at least 15%, preferentially at least 20%, and also, in general, not more than 70%, preferably not more than 60%, and with particular preference not more than 50%, by weight, of one or more difunctional or polyfunctional monomers which are sparingly soluble or insoluble in water (monomers II), in copolymerized form, based on the total weight of the monomers.

Additionally the polymers may comprise up to 40%, preferably up to 30%, more particularly up to 20%, by weight, of other monomers III, in copolymerized form.

The capsule wall is preferably synthesized only from monomers of groups I and II.

Suitable monomers I are $C_1$-$C_{24}$ alkyl esters of acrylic and/or methacrylic acid and also the unsaturated $C_3$ and $C_4$ carboxylic acids such as acrylic acid, methacrylic acid, and also maleic acid. Suitable monomers I are isopropyl, isobutyl, sec-butyl, and tert-butyl acrylates and the corresponding methacrylates, and also, with particular preference, methyl, ethyl, n-propyl, and n-butyl acrylates and the corresponding methacrylates. In general the methacrylates and methacrylic acid are preferred.

According to one preferred embodiment the microcapsule walls comprise 25% to 75% by weight of maleic acid, methacrylic acid and/or acrylic acid, more particularly methacrylic acid, based on the total amount of the monomers I, in copolymerized form.

Suitable monomers II are difunctional or polyfunctional monomers which are sparingly soluble or insoluble in water but have good to limited solubility in the lipophilic substance. By sparing solubility is meant a solubility of less than 60 g/l at 20° C. By difunctional or polyfunctional monomers are meant compounds which have at least two nonconjugated ethylenic double bonds. Contemplated primarily are divinyl monomers and polyvinyl monomers. They bring about crosslinking of the capsule wall during the polymerization. It is possible to copolymerize one or more divinyl monomers and also one or more polyvinyl monomers, and also divinyl monomers in a mixture with polyvinyl monomers.

In accordance with one preferred embodiment a mixture of divinyl monomers and polyvinyl monomers is used as monomer II, the fraction of the polyvinyl monomers being 2% to 90% by weight, based on the sum of divinyl monomers and polyvinyl monomers. Preferably the fraction of the polyvinyl monomers is 5% to 80% by weight, preferentially 10% to 60% by weight, based on the sum of divinyl and polyvinyl monomers.

Suitable divinyl monomers are divinylbenzene and divinylcyclohexane. Preferred divinyl monomers are the diesters of diols with acrylic acid or methacrylic acid, and also the diallyl and divinyl ethers of these diols. Mention may be made, by way of example, of ethanediol diacrylate, ethylene glycol dimethacrylate, 1,3-butylene glycol dimeth-acrylate, methallylmethacrylamide, allyl acrylate, and allyl methacrylate. Particular preference is given to propanediol, butanediol, pentanediol, and hexanediol diacrylates and the corresponding methacrylates.

Preferred polyvinyl monomers are the polyesters of polyols with acrylic acid and/or methacrylic acid, and also the polyallyl and polyvinyl ethers of these polyols, trivinyl-benzene and trivinylcyclohexane. Particular preference is given to trimethylolpropane triacrylate and trimethacrylate, pentaerythritol triallyl ether, pentaerythritol tetraallyl ether, pentaerythritol triacrylate, and pentaerythritol tetraacrylate, and also their technical mixtures.

Preference is given to the combinations of divinyl and polyvinyl monomers such as of butanediol diacrylate and pentaerythritol tetraacrylate, hexanediol diacrylate and pentaerythritol tetraacrylate, butanediol diacrylate and trimethylolpropane triacrylate, and also hexanediol diacrylate and trimethylolpropane triacrylate.

Monomers III contemplated are other monomers, different than the monomers I and II, such as vinyl acetate, vinyl propionate, vinylpyridine, and styrene or α-methylstyrene. Particular preference is given to itaconic acid, vinylphosphonic acid, maleic anhydride, 2-hydroxyethyl acrylate and methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethyl-aminoethyl methacrylate.

The preparation process of the invention is what is called an in situ polymerization. The principle of microcapsule formation is based on the preparation of a stable oil-in-water emulsion from the monomers, a free-radical initiator, the protective colloid, and the lipophilic substance to be encapsulated. Subsequently the polymerization of the monomers is triggered by heating and is controlled, if appropriate, by further increase in temperature, the resulting polymers forming the capsule wall which encloses the lipophilic substance. This general principle is described, for example, in DE-A 101 39 171, expressly incorporated by reference.

In accordance with the present invention a combination of an $SiO_2$-based protective colloid and a methylhydroxy-($C_1$-$C_4$)-alkylcellulose is used. In this context it has emerged that the combination with a relatively low molecular weight methylhydroxy-($C_1$-$C_4$)-alkylcellulose leads to advantageous properties. In accordance with the invention a methylhydroxy-($C_1$-$C_4$)-alkylcellulose is used which has an average molecular weight (weight average) $\leq 50\,000$ g/mol, preferably from the range from 5 000 to 50 000 g/mol, preferentially from 10 000 to 35 000 g/mol, more particularly 20 000 to 30 000 g/mol.

By methylhydroxy-($C_1$-$C_4$)-alkylcellulose is meant methylhydroxy-($C_1$-$C_4$)-alkylcellulose having any of a very wide variety of degrees of methylation and degrees of alkoxylation.

Methylhydroxy-($C_1$-$C_4$)-alkylcelluloses are prepared in a known way by means of two reaction steps. In one step the cellulose is alkoxylated with alkylene oxides. In the second step the hydroxyl groups present are methylated with a methyl halide. These two reactions generally take place in succession, but can also be carried out simultaneously. Depending on the stoichiometry of the alkylene oxides and alkylating agents used to the cellulose, there is variation in the degree of substitution of the cellulose. The average degree of substitution (DS) indicates the number of hydroxyl units of a dehydroglucose unit that have been etherified on average, and can be from 0 to 3. The degree of molar substitution (MS) indicates the average number of alkoxy units per dehydroglycose unit, and can also be greater than 3 as a result of the synthesis of side chains during the alkoxylation.

The preferred methylhydroxy-($C_1$-$C_4$)-alkylcelluloses possess an average degree of substitution, DS, of 1.1 to 2.5 and a degree of molar substitution, MS, of 0.03 to 0.9.

Suitable methylhydroxy-($C_1$-$C_4$)-alkylcelluloses are, for example, methylhydroxyethyl-cellulose or methylhydroxypropylcellulose. Particular preference is given to methylhydroxypropylcellulose.

Methylhydroxy-($C_1$-$C_4$)-alkylcelluloses of this kind are available, for example, under the trade names Culminal® from the company Hercules/Aqualon.

Suitable $SiO_2$-based protective colloids are highly disperse silicas, which can be dispersed in the form of fine, solid particles in water or can be used in the form of what are called colloidal dispersions of silica in water. Colloidal dispersions of this kind are alkaline, aqueous mixtures of silica. In the alkaline pH range the particles are swollen and stable in water. For the use of these dispersions as protective colloids it is advantageous if the pH of the oil-in-water emulsion is adjusted to 2 to 7 with an acid. Preferred colloidal dispersions of silica have a specific surface area at a pH of 9.3 in the range from 70 to 90 $m^2/g$.

Preferred $SiO_2$-based protective colloids are highly disperse silicas whose average particle size is in the range from 40 to 150 nm at pH levels in the range of 8-11. Mention may be made, by way of example, of Levasil® 50/50 (H. C. Starck), Köstrosol® 3550 (CWK Bad Köstritz), and Bindzil® 50/80 (Akzo Nobel Chemicals).

The sequence of the metering of the $SiO_2$-based protective colloid and the methyl-hydroxy-($C_1$-$C_4$)-alkylcellulose generally has no effect on the process and may take place jointly or separately.

In general the $SiO_2$-based protective colloid and the methylhydroxy-($C_1$-$C_4$)-alkyl-cellulose are used in a total amount of 0.1% to 15% by weight, preferably of 0.5% to 10% by weight, based on the water phase. The methylhydroxy-($C_1$-$C_4$)-alkylcellulose is used preferably in an amount of 0.5% to 1.5% by weight, more particularly of 0.6% to 0.8% by weight, based on the $SiO_2$-based protective colloid.

In addition it is possible, as well as the $SiO_2$-based protective colloid and the methyl-hydroxy-($C_1$-$C_4$)-alkylcellulose, to use further organic or inorganic protective colloids, in amounts less than 15% by weight, based on the total weight of the microcapsules.

These further protective colloids, different than the protective colloids used in accordance with the invention, may be either organic or inorganic protective colloids, and may be ionic or neutral.

Organic neutral protective colloids are, for example, hydroxyethylcellulose, methyl-cellulose, and carboxymethylcellulose, polyvinylpyrrolidone, vinylpyrrolidone copolymers, gelatin, gum arabic, xanthan, casein, polyethylene glycols, polyvinyl alcohol, and partially hydrolyzed polyvinyl acetates.

Organic anionic protective colloids are sodium alginate, polymethacrylic acid and its copolymers, polyacrylic acid and its copolymers, the copolymers of sulfoethyl acrylate and methacrylate, of sulfopropyl acrylate and methacrylate, of N-(sulfoethyl)maleimide, and of 2-acrylamido-2-alkylsulfonic acids, styrenesulfonic acid, and vinylsulfonic acid. Preferred organic anionic protective colloids are naphthalenesulfonic acid and naphthalenesulfonic acid-formaldehyde condensates, and also, in particular, polyacrylic acids and phenolsulfonic acid-formaldehyde condensates.

A further possibility is to add surfactants for costabilization, preferably nonionic surfactants. Suitable surfactants can be found in the "Handbook of Industrial Surfactants", whose content is expressly incorporated by reference. The surfactants can be used in an amount of 0.01% to 10% by weight, based on the water phase of the emulsion.

As free-radical initiators for the free-radical polymerization reaction it is possible to use the typical peroxo compounds and azo compounds, appropriately in amounts of 0.2% to 5% by weight, based on the weight of the monomers.

Depending on the aggregate state of the free-radical initiator and on its solubility behavior, it may be supplied as such, or preferably as a solution, emulsion or suspension, as a result of which it is possible to carry out more precise metering of, more particularly, small amounts of free-radical initiator substance.

Preferred free-radical initiators include tert-butyl peroxoneodecanoate, tert-amyl peroxypivalate, tert-amyl peroxy-2-ethylhexanoate, 2,2'-azobis-(2,4-dimethyl)valero-nitrile, 2,2'-azobis(2-methylbutyronitrile), dibenzoyl peroxide, tert-butyl per-2-ethyl-hexanoate, di-tert-butyl peroxide, tert-butyl hydroperoxide, 2,5-dimethyl-2,5-di(tert-butylperoxy)hexane, and cumene hydroperoxide.

Particularly preferred free-radical initiators are di(3,5,5-trimethylhexanoyl)peroxide, 4,4'-azobisisobutyronitrile, tert-butyl perpivalate, dilauroyl peroxide, and dimethyl-2,2'-azobisisobutyrate. These initiators have a half-life of 10 hours in a temperature range from 30 to 100° C.

Additionally it is possible, for the polymerization, to add regulators known to the skilled worker, in typical quantities, such as tert-dodecylmercaptan or ethylhexyl thioglycolate.

The dispersing conditions for the preparation of the stable oil-in-water emulsion are preferably selected in conventional manner such that the oil droplets have the size of the desired microcapsules.

Generally speaking, the $SiO_2$-based protective colloid is alkali-stabilized. For the preparation of the oil-in-water emulsion it is advantageous to lower the pH of the emulsion, usually to a pH in the range of 2 to 7. According to one preferred embodiment the pH of the oil-in-water emulsion is adjusted to a level in the range of 1.5-4, preferably 2-3, more particularly approximately 2.5. This can be done by adding acids such as hydrochloric acid, sulfuric acid, nitric acid, formic acid or phosphoric acid.

The microcapsules are preferably formed by subjecting the oil-in-water emulsion to free-radical polymerization by heating. Generally speaking, the polymerization is carried out at temperatures in the range from 20 to 120° C. and preferably from 40 to 95° C. Depending on the desired lipophilic substance, the oil-in-water emulsion is to be formed at a temperature at which the core material is liquid/oily. Correspondingly the polymerization should be carried out 2 to 50 K above this temperature, and so, if appropriate, a free-radical initiator is selected whose decomposition temperature lies above the melting point of the lipophilic substance.

A common process variant for lipophilic substances having a melting point up to about 60° C. is a reaction temperature beginning at 60° C. and increased in the course of the reaction to 85° C. Advantageous free-radical initiators have a 10-hour half-life in the range from 45 to 65° C., such as tert-butyl perpivalate.

According to a further process variant for lipophilic substances having a melting point above 60° C., a temperature program is selected which starts at correspondingly higher reaction temperatures. For initial temperatures around 85° C., free-radical initiators having a 10-hour half-life in the range from 70 to 90° C. are preferred, such as tert-butyl per-2-ethylhexanoate.

Appropriately the polymerization is performed under atmospheric pressure, though it is also possible to operate under reduced or slightly increased pressure, in the case, for example, of a polymerization temperature above 100° C.; in other words, approximately, in the range from 0.5 to 5 bar.

The polymerization reaction times are normally 1 to 10 hours, usually 2 to 5 hours.

Following the polymerization reaction proper, at a conversion of 90% to 99% by weight, it is advantageous, generally speaking, largely to free the aqueous microcapsule dispersions from odorants, such as residual monomers and other volatile organic constituents. This can be achieved in conventional manner, physically by distillative removal (more particularly via steam distillation) or by stripping with an inert gas. It may also take place chemically, as described in WO 99/24525, advantageously by means of redox-initiated polymerization, as described in DE-A 44 35 423, DE-A 44 19 518, and DE-A 44 35 422.

In this way it is possible to prepare microcapsules having an average particle size in the range from 0.5 to 100 µm, it being possible to adjust the particle size in conventional manner via the shearing force, the stirring speed, and its concentration. Preference is given to microcapsules having an average particle size in the range from 0.5 to 50 µm, preferably 0.5 to 30 µm, more particularly 3 to 7 µm (Z-average by means of light scattering).

It is possible to treat the microcapsules with polyelectrolyte, which if appropriate may further improve the imperviousness of the capsules. Processes for their preparation, and also suitable polyelectrolytes, are described in the earlier European application 06122418.4, expressly incorporated by reference.

Depending on the lipophilic substance, the microcapsules of the invention are suitable for carbonless copy paper, in cosmetology, for the encapsulation of fragrances, flavors, adhesives, and biocides, or in crop protection. The process of the invention is particularly suitable for the encapsulation of latent heat storage materials.

Latent heat storage materials are, by definition, substances which exhibit a phase transition in the temperature range in which a heat transfer is to take place, and are therefore often also referred to in the literature as PCMs (Phase Change Materials). The substance in question is preferably an organic lipophilic substance which has its solid/liquid phase transition in the temperature range from −20 to 120° C.

Examples include:

aliphatic hydrocarbon compounds such as saturated or unsaturated $C_{10}$-$C_{40}$ hydrocarbons, which are branched or preferably linear, e.g., such as n-tetra-decane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g., cyclohexane, cyclooctane, cyclodecane;

aromatic hydrocarbon compounds such as benzene, naphthalene, biphenyl, o- or m-terphenyl, $C_1$-$C_{40}$ alkyl-substituted aromatic hydrocarbons such as dodecyl-benzene, tetradecylbenzene, hexadecylbenzene, hexylnaphthalene or decyl-naphthalene;

saturated or unsaturated $C_6$-$C_{30}$ fatty acids such as lauric, stearic, oleic or behenic acid, preferably eutectic mixtures of decanoic acid with, for example, myristic, palmitic or lauric acid;

fatty alcohols such as lauryl, stearyl, oleyl, myristyl, and cetyl alcohols, mixtures such as coconut fatty alcohol, and also the alcohols known as oxo-process alcohols, which are obtained by hydroformylation of α-olefins and further reactions;

$C_6$-$C_{30}$-fatty amines, such as decylamine, dodecylamine, tetradecylamine or hexadecylamine;

esters such as $C_1$-$C_{10}$ alkyl esters of fatty acids, such as propyl palmitate, methyl stearate or methyl palmitate, and also, preferably, their eutectic mixtures, or methyl cinnamate;

natural and synthetic waxes such as montan acid waxes, montan ester waxes, carnauba wax, polyethylene wax, oxidized waxes, polyvinyl ether wax, ethylene-vinyl acetate wax or hard waxes from Fischer-Tropsch processes;

halogenated hydrocarbons such as chlorinated paraffin, bromooctadecane, bromopentadecane, bromononadecane, bromoeicosane, and bromodocosane.

Additionally, mixtures of these substances are suitable, provided the melting point is not lowered outside of the desired range, or the heat of fusion of the mixture is not too low for sensible application.

Advantageous, for example, is the use of pure n-alkanes, n-alkanes having a purity of greater than 80%, or alkane mixtures of the kind obtained as technical-grade distillate which as such are commercially customary.

Additionally it may be advantageous to add to the lipophilic substances compounds that are soluble therein, in order thus to prevent the retarded crystallization that sometimes occurs with the nonpolar substances. Advantageously, as described in U.S. Pat. No. 5,456,852, compounds with a melting point 20 to 120 K higher than that of the actual core substance are used. Suitable compounds are the fatty acids, fatty alcohols, fatty amides, and aliphatic hydrocarbon compounds mentioned above as lipophilic substances. They are added in amounts of 0.1% to 10% by weight, based on the capsule core.

The latent heat storage materials are selected according to the temperature range in which the heat storage media are desired. For heat storage media in building materials in a moderate climate, for example, preference is given to using latent heat storage materials whose solid/liquid phase transition is situated in the temperature range from 0 to 60° C. Thus, for interior applications, individual materials or mixtures with conversion temperatures of 15 to 30° C. are generally selected. For applications in the textile sector, conversion temperatures of 0 to 40° C. are especially advantageous.

Preferred latent heat storage materials are aliphatic hydrocarbons, with particular preference those exemplified above. Preference is given more particularly to aliphatic hydrocarbons having 14 to 20 carbon atoms, and also mixtures thereof.

The microcapsule dispersions obtained by the process of the invention can be used directly in the form of an aqueous dispersion. In that form they possess good storage stability and temperature stability. The microcapsule dispersions can be put to diverse uses—for example, as dispersions in the construction-related chemical industry, or for the coating of textiles, fibers, paper, cardboard or foam material, or as heat transfer fluids.

According to one preferred embodiment the microcapsules are isolated in a subsequent process step by spray-drying of the aqueous microcapsule dispersion.

Accordingly the present invention also comprises a process for preparing microcapsules comprising a lipophilic capsule core and a capsule wall synthesized from 30% to 100% by weight, based on the total weight of the monomers, of one or more monomers (monomers I) from the group comprising $C_1$-$C_{24}$ alkyl esters of acrylic and/or methacrylic acid, acrylic acid, methacrylic acid, and maleic acid, 0% to 70% by weight, based on the total weight of the monomers, of one or more difunctional or polyfunctional monomers (monomers II) which are sparingly soluble or insoluble in water, and 0% to 40% by weight, based on the total weight of the monomers, of one or more other monomers (monomers III), by preparing a) an oil-in-water emulsion comprising monomers and lipophilic substance, an $SiO_2$-based protective colloid, and a methylhydroxy-($C_1$-$C_4$)-alkylcellulose having an average molecular weight $\leq$50 000 g/mol, b) subsequently carrying out a free-radical polymerization, and c) spray-drying the microcapsule dispersion obtained from b).

The spraying of the aqueous polymer dispersion takes place preferably in a stream of hot air using single-fluid nozzles. The droplet size on exit is selected so as to produce a microcapsule powder in which the powder particles have an average particle size in the range of 100-400 μm and 80% by weight of the particles have a size $\geq$90 μm. The nozzle diameter and the upstream pressure of the stream of material is selected by the skilled worker as a function of the viscosity of the microcapsule dispersion. The higher the upstream pressure, the smaller the droplets which are produced. Typically the microcapsule dispersion is fed in within the range of 2-200 bar. It is advantageous to use a single-fluid nozzle with a twist generator. Via the selection of the twist generator it is additionally possible to influence droplet size and spray angle. For example, it is possible to use single-fluid nozzles from Delavan, which have a typical construction consisting of swirl chamber, which influences the spray angle, and perforated plate, which influences the throughput.

The general procedure adopted is such that the inlet temperature of the hot air stream is in the range from 100 to 200° C., preferably 120 to 180° C., and the outlet temperature of the hot air stream is in the range from 30 to 110° C., preferably 50 to 90° C. The temperature difference between inlet temperature and outlet temperature is preferably at least 50° C., more preferably at least 60° C., and with particular preference at least 70° C. Fines are normally separated from the gas stream using cyclones or filter separators. The fines are preferably redispersed and returned to the stream of material. The sprayed aqueous polymer dispersion and the stream of hot air are preferably routed in parallel.

According to one process variant it is possible to insert a fluidized bed downstream of the dryer, in order to remove any residual moisture. Processes where spray drying is followed by fluidized bed drying are preferred, since they lead to a microcapsule powder having a smaller fines fraction.

Useful spray towers include, for example, dryers from Anhydro, Miro or Nubilosa, with tower heights of 12-30 meters and widths of 3 to 8 meters. The drying air throughput for such spray towers is typically in the range of 20-30 t/h. The microcapsule dispersion throughput is in that case generally 1 to 1.5 t/h.

The powder properties, furthermore, may also be influenced by the temperature of the aftertreatment with which the powder is discharged from the spray tower. Temperature ranges of 20-30° C. are typically set, rarely higher than 40° C.

If appropriate, spraying assistants are added to the spray-drying operation in order to facilitate that operation, or to set specific powder properties, such as low dust, free-flowability or improved redispersibility, for example. A multiplicity of spraying assistants are familiar to the skilled worker. Examples of such assistants are found in DE-A 196 29 525, DE-A 196 29 526, DE-A 22 14 410, DE-A 24 45 813, EP-A 407 889 or EP-A 784 449. Examples of advantageous spraying assistants are water-soluble polymers of the polyvinyl alcohol type, or partially hydrolyzed polyvinyl acetates, cellulose derivatives such as hydroxyethylcellulose, carboxymethylcellulose, methylcellulose, methylhydroxyethylcellulose, and methylhydroxypropylcellulose, polyvinylpyrrolidone, vinylpyrrolidone copolymers, gelatin, preferably polyvinyl alcohol and partially hydrolyzed polyvinyl acetates. A methylhydroxy-$(C_1$-$C_4)$-alkylcellulose is preferably selected as spraying assistant. Particular preference is given to using a methylhydroxy-$(C_1$-$C_4)$-alkylcellulose having an average molecular weight $\leq 50\,000$ g/mol, and more particularly methylhydroxypropylcellulose, as spraying assistant.

The microcapsule powder obtained in accordance with the invention is readily redispersible even across the great width of its many different applications in binder dispersions and with different fillers. Furthermore, even after prolonged storage of the powder, the microcapsule powder of the invention shows no tendency toward blocking in normal storage. The microcapsule powder obtained in this way can be incorporated advantageously not only into textiles such as textile fabrics, textile coatings, nonwovens (e.g., batts), etc., but also into bindered building materials with mineral, silicatic or polymeric binders.

The process of the invention does not exhibit any thickening tendency at all, and can be reproduced effectively. Even when using overaged $SiO_2$ Pickering systems, which it has hitherto not been possible to process any longer, minimal thickening at most is observed in the batches, but has no effect on the reaction regime.

The examples below are intended to illustrate the invention. The percentages in the examples are by weight unless otherwise indicated.

The particle size of the microcapsule powder was determined using a Malvern particle sizer type 3600E in accordance with a standard measurement method which is documented in the literature.

EXAMPLE 1

Water phase:

| | |
|---|---|
| 680 g | water |
| 110 g | 50% by weight silica sol (specific surface area about 80 m²/g, pH about 9.3) |
| 8 g | 5% strength by weight aqueous solution of methylhydroxypropylcellulose with an average molecular weight of 26 000 g/mol |
| 2.1 g | 2.5% strength by weight aqueous sodium nitrite solution |
| 3.8 g | 20% strength nitric acid solution in water |

Oil phase

| | |
|---|---|
| 431 g | mixture of substantially linear paraffins with a melting point of 26° C. |
| 9 g | technical-grade paraffin with a melting point of 65° C. |
| 82.5 g | methyl methacrylate |
| 27.5 g | butanediol acrylate |
| 0.76 g | ethylhexyl thioglycolate |

Addition 1

| | |
|---|---|
| 0.92 g | 75% strength solution of tert-butyl perpivalate in aliphatic hydrocarbons |

Feed 1:

| | |
|---|---|
| 7.14 g | 10% strength by weight aqueous tert-butyl hydroperoxide solution |

Feed 2:

| | |
|---|---|
| 28.38 g | 1% strength aqueous ascorbic acid solution |

The water phase was introduced at 40° C., the melted and homogeneously mixed oil phase was added, and the combined phases were dispersed for 40 minutes using a high-speed dissolver stirrer (disk diameter 5 cm) at 3500 rpm. Addition 1 was added. The emulsion was held at 67° C., with stirring with an anchor stirrer, over 60 minutes, heated to 85° C. over the course of a further 60 minutes, and held at 85° C. for an hour. Feed 1 was added to the resulting microcapsule dispersion with stirring. Feed 2 was added with metering over 90 minutes and with stirring, in the course of which the dispersion was cooled to room temperature. It was then neutralized with aqueous sodium hydroxide solution. This gave a microcapsule dispersion having an average particle size of 6.5 µm and a solids content of 43.7%.

Creaming can be prevented in conventional manner by adding thickeners after the dispersion has cooled to room temperature.

EXAMPLE 2

The reaction conditions of example 1 were retained, with the difference that an artificially aged silica sol was used.

The ageing of the silica sol was brought about by storing the silica sol at 50° C. for 10 weeks. In spite of the aged silica sol, there was no substantial thickening of the reaction mixture. The aged silica sol could still be processed with the protective colloid selected in accordance with the invention. This gave a microcapsule dispersion having an average particle size of 6.5 µm.

Under real-life conditions, it is possible within a few days for a batch which exhibits only slight thickening with protective colloids other than the organic protective colloids of the invention suddenly to become incapable of being processed. Through use of the protective colloids according to the invention it is possible nevertheless to continue working with this material.

EXAMPLE 3

Comparative Example, not Inventive

A procedure analogous to that of example 1 was used, with the difference that the methylhydroxypropylcellulose was omitted. With the onset of polymerization, at about 70° C., complete coagulation was observed, with the consequences that it was not possible to measure a relative increase in torque at 85° C. and that the batch had to be discarded.

EXAMPLE 4

Comparative Example, not Inventive

A procedure analogous to that of example 1 was used, with the difference that the aged silica sol of example 2 was used.

A further difference was that the methylhydroxy-propylcellulose of the invention was replaced by 2 g of a 20% strength solution of a copolymer synthesized from 59% AMPS, 20% acrylic acid, 20% methyl acrylate, and 1% styrene. Again, at 85° C., complete coagulation was observed.

EXAMPLES 5 TO 10

The ingredients and conditions selected were the same as those in example 1, but using the aged silica sol of example 2. A further difference was that the methylhydroxy-propylcellulose of the invention was replaced by x % strength by weight aqueous solutions of methylhydroxypropylcellulose (MHPC) or methylhydroxyethylcellulose (MHEC) with inventive or higher molecular weights. Furthermore, there was variation in the relative amount of methylhydroxy-($C_1$-$C_4$)-alkylcellulose/silica sol. The respective methylhydroxy-($C_1$-$C_4$)-alkylcellulose, its average molecular weight, and its relative amount with respect to the silica sol (solid/solid) are included in the table below. The table also shows the relative torque ($M_{rel}$) at 85° C. in comparison to the torque at the beginning of the heating program (moment immediately prior to the addition of the initiator, 40° C.). A relative increase in torque of 2 denotes a doubling of the torque. It was found that a relative increase in torque of 2 was still tolerable. Batches which showed even higher increases tended toward the formation of coagulum, extending to the point of complete unusability.

TABLE

| Ex. | Methylhydroxy-($C_1$-$C_4$)-alkylcellulose used as x % strength by weight aqueous solution | $M_w$ | Relative amount of methylhydroxy-($C_1$-$C_4$)-alkylcellulose/silica sol (solid/solid) | $M_{rel}$ |
|---|---|---|---|---|
| 5 (n.i.) | MHEC 1% strength by weight | 120 000 | 0.0036 | * |
| 6 (n.i.) | MHEC 1% strength by weight | 120 000 | 0.0073 | * |
| 7 | MHPC 5% strength by weight | 26 000 | 0.0036 | 2 |
| 8 | MHPC 5% strength by weight | 26 000 | 0.0109 | 1.5 |
| 9 | MHPC 7.5% strength by weight | 17 000 | 0.0073 | 1.75 |
| 10 (n.i.) | MHPC 2% strength by weight | 75 000 | 0.0073 | * |

* In examples 5, 6, and 10 it was not possible to determine the relative torque $M_{rel}$, since the reaction mixture had undergone complete coagulation. Examples 5, 6, and 10, as comparative examples, are not inventive (n.i.).

The invention claimed is:

1. A process for preparing a microcapsule comprising a lipophilic capsule core and a capsule wall synthesized from
   30% to 100% by weight, based on the total weight of monomers, of one or more monomers (monomers I) selected from the group consisting of $C_1$-$C_{24}$ alkyl esters of acrylic acid, $C_1$-$C_{24}$ alkyl esters of methacrylic acid, acrylic acid, methacrylic acid, and maleic acid,
   0% to 70% by weight, based on the total weight of the monomers, of one or more difunctional or polyfunctional monomers (monomers II) which are sparingly soluble or insoluble in water, and
   0% to 40% by weight, based on the total weight of the monomers, of one or more other monomers (monomers III),
   comprising preparing an oil-in-water emulsion comprising monomers and lipophilic substance, an $SiO_2$-based protective colloid, and a methylhydroxy-($C_1$-$C_4$)-alkyl-cellulose having an average molecular weight $\leq 50\,000$ g/mol and subsequently carrying out a free-radical polymerization.

2. The process according to claim 1, wherein the oil-in-water emulsion comprises an $SiO_2$-based protective colloid and a methylhydroxypropylcellulose.

3. The process according to claim 1, wherein the oil-in-water emulsion comprises an $SiO_2$-based protective colloid and a methylhydroxy-($C_1$-$C_4$)-alkylcellulose having an average degree of substitution, DS, of 1.1 to 2.5 and a degree of molar substitution, MS, of 0.03 to 0.9.

4. The process according to claim 1, wherein the $SiO_2$-based protective colloid is obtained from highly disperse silicas having average particle sizes in the range from 40 to 150 nm.

5. The process according to claim 1, wherein the methylhydroxy-($C_1$-$C_4$)-alkylcellulose used is in an amount of 0.5% to 1.5% by weight, based on the $SiO_2$-based protective colloid.

6. The process according to claim 1, wherein the oil-in-water emulsion is free-radically polymerized by heating.

7. The process according to claim 1, wherein the oil-in-water emulsion is adjusted to a pH in the range from 2 to 7.

8. A process for preparing a microcapsule comprising a lipophilic capsule core and a capsule wall synthesized from
   30% to 100% by weight, based on the total weight of monomers, of one or more monomers (monomers I) selected from the group consisting of $C_1$-$C_{24}$ alkyl esters of acrylic acid, $C_1$-$C_{24}$ alkyl esters of methacrylic acid, acrylic acid, methacrylic acid, and maleic acid,
   0% to 70% by weight, based on the total weight of the monomers, of one or more difunctional or polyfunctional monomers (monomers II) which are sparingly soluble or insoluble in water, and
   0% to 40% by weight, based on the total weight of the monomers, of one or more other monomers (monomers III),
   comprising preparing
   a) an oil-in-water emulsion comprising monomers and lipophilic substance, an $SiO_2$-based protective colloid, and a methylhydroxy-($C_1$-$C_4$)-alkylcellulose having an average molecular weight $\leq 50\,000$ g/mol,
   b) subsequently carrying out a free-radical polymerization to obtain the microcapsule dispersion, and
   c) spray-drying the microcapsule dispersion obtained from b).

9. The process according to claim 8, wherein a methylhydroxy-($C_1$-$C_4$)-alkyl-cellulose is selected as a spraying assistant.

10. The process according to claim 8, wherein a methylhydroxy-($C_1$-$C_4$)-alkyl-cellulose having an average molecular weight $\leq 50\,000$ g/mol is selected as a spraying assistant.

11. The process according to claim 1, wherein the monomers II have a solubility of less than 60 g/l at 20° C.

12. The process according to claim 1, wherein the monomers II comprise a divinyl monomer or a polyvinyl monomer or mixtures thereof.

13. The process according to claim 1, wherein the monomers II comprise a divinyl monomer and a polyvinyl monomer, the fraction of the polyvinyl monomer being 2% to 90% by weight, based on the sum of divinyl monomer and polyvinyl monomer.

14. The process according to claim 1, wherein the monomers II comprise at least one divinyl monomer selected from the group consisting of propanediol, butanediol, pentanediol, a hexanediol diacrylate and the corresponding methacrylates.

15. The process according to claim 1, wherein the monomers II comprise at least one polyvinyl monomer selected from the group consisting of trimethylolpropane triacrylate, trimethylolpropane trimethacrylate, pentaerythritol triallyl ether, pentaerythritol tetraallyl ether, pentaerythritol triacrylate, and pentaerythritol tetraacrylate.

16. The process according to claim 1, wherein the monomers III comprise at least one monomer selected from the group consisting of itaconic acid, vinylphosphonic acid, maleic anhydride, 2-hydroxyethyl acrylate, 2-hydroxyethyl methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethylaminoethyl methacrylate.

17. The process according to claim 1, wherein the $SiO_2$-based protective colloid and the methylhydroxy-$(C_1$-$C_4)$-alkyl-cellulose are used in a total amount of from 0.1 to 15% by weight based on the water phase.

18. The process according to claim 1, wherein a further organic or inorganic protective colloid is added to the oil-in-water emulsion in an amount of less than 15% by weight, based on the water phase.

19. The process according to claim 1, wherein the $SiO_2$-based protective colloid is alkali-stabilized.

20. The process according to claim 1, wherein the pH of the oil-in-water emulsion is adjusted to a level in the range of 1 to 4.

* * * * *